March 8, 1955 P. O. MIX 2,703,584
REPLACEMENT VALVE
Filed Nov. 8, 1949

INVENTOR.
PAUL O. MIX
BY Woodling and Krost
his Attnys

WITNESS
Clyde H. Haynes

United States Patent Office 2,703,584
Patented Mar. 8, 1955

2,703,584

REPLACEMENT VALVE

Paul O. Mix, Cleveland, Ohio

Application November 8, 1949, Serial No. 126,110

14 Claims. (Cl. 137—454.6)

My invention relates, in general, to replacement valves for faucets and the like and in particular to replacement valves in which a valve seal washer is substantially completely enclosed in a supporting structure.

The applicant understands that others have designed and constructed replacement valves and faucets and the like wherein they have used a resilient member seatable against a metal valve member. Applicant has discovered that the resilient member, which generally is constructed from rubber, deteriorates after a period of time and loses its shape, thus the resilient member after a time will not maintain a closed valve.

I have designed and constructed a replacement valve for faucets wherein a plug or valve member is seatable against and in a resilient valve seal washer. In my replacement valve, the valve seal washer is substantially enclosed by supporting structure when the valve is turned off so that deterioration or growth of the seal washer after it has been in use for a time, will tend to reduce the diameter of the hole in the washer, thus resulting in a more secure shut off.

One of the objects of my invention is to provide a replacement valve structure in which resilient washers cannot be extruded by pressure.

Another object of my invention is to provide a replacement valve structure in which neither a packing washer closing off the old valve seat nor a seal washer cooperating with a new valve seat can be extruded by pressure.

Another object of my invention is to provide a valve structure with a valve seal washer constructed of resilient material so that any growth of the washer due to deterioration will reduce the diameter of the hole therein, thus resulting in a more secure closing of the valve.

Another object of my invention is to construct a valve from a resilient valve seal washer and a tapered plug having a shoulder thereabout wherein the tapered plug extends into the washer with the shoulder seatable against the washer.

Another object of my invention is to provide a replacement valve in which normal deterioration of resilient washers and erosion of the valve seat will not result in a leaky valve.

Other objects and a fuller understanding of my invention may be had by referring to the following decription and claims, taken in conjunction with the accompanying drawing, in which:

Figure 1:
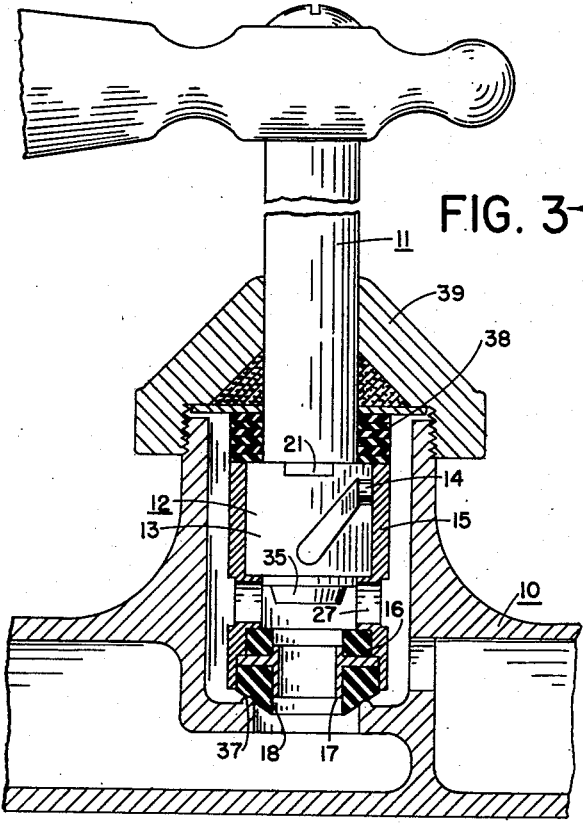
Figure 1 is a sectional view of a faucet or the like having my replacement valve mounted therein with the valve in open position.

In Figure 1 of my drawings, I have illustrated a faucet having my replacement valve therein. Although I illustrate a particular design of faucet, it is understood that my replacement valve can be used in any similar device. This replacement valve is inserted in the faucet by removing the old valve stem and inserting the new replacement valve therein.

For purposes of description, I have designated the body of the faucet as having reference character 10, the new valve stem as having reference character 11, and the new replacement valve structure as having the reference character 12.

The new valve stem may be constructed of any suitable material. However, I have found it preferable to use a metal rod. I have provided the valve stem 11 with a cam sleeve 13 and a cam pin 14. The cam pin 14 is secured in the valve stem 11 and engages the cam sleeve 13 to move the valve stem 11 axially upon turning of the valve stem relative to the cam sleeve 13. The cam action permits the opening and closing of the valve in either clockwise or counter-clockwise direction, and will fit either right or left-hand faucets.

The replacement valve structure comprises in general a hollow sleeve 15 adapted to receive therein a valve seal washer 16, a flanged ferrule 17 and a packing seal member 18. The hollow sleeve 15 has a cam sleeve engagement surface 19 frictionally receiving the cam sleeve 13 for supporting the replacement valve structure 12 on the valve stem 11. I have also provided a notch 20 in the end of the hollow sleeve 15 and thus in the end of the cam sleeve engagement surface 19 to receive a tab portion 21 of the cam sleeve 13 for preventing turning of the hollow sleeve 15 relative to the cam sleeve 13. In observing Figures 1 and 2 of the drawings, I have illustrated that rotation of the valve stem 11 relative to the faucet body 10 and the cam sleeve 13, causes it to move endwise of the hollow sleeve 15.

Figure 3:
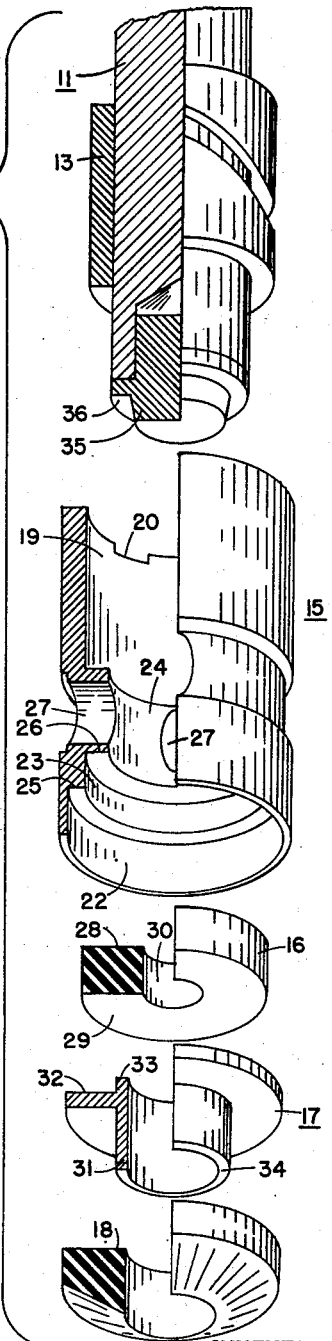
Figure 3 is an exploded isometric view of the parts of my replacement valve, with the parts shown partially in cross-section to particularly illustrate the construction.

This hollow sleeve 15, as is best illustrated in Figure 3, is also provided with a packing receiving surface 22 and a valve seal washer receiving surface 23. These surfaces 22 and 23 are internal surfaces with the packing receiving surface 22 disposed on one end of the hollow sleeve 15 and the cam sleeve engaging surface 19 disposed on the other end of the hollow sleeve 15. The valve seal washer receiving surface 23 is next adjacent to the packing receiving surface 22 and is defined by a bore of smaller diameter than the bore of the packing receiving surface 22. An outlet surface 24, internal of the hollow sleeve 15, separates the valve seal washer receiving surface 23 from the cam sleeve engaging surface 19. This outlet surface 24 is defined by a bore having smaller diameter than the bore of the valve seal washer receiving surface 23 and also, in this instance, of smaller diameter than the cam sleeve engaging surface 19. The packing receiving surface 22 terminates in a flanged ferrule engagement shoulder 25 which is disposed between the packing receiving surface 22 and the valve seal washer receiving surface 23. Similarly, the valve seal washer receiving surface 23 terminates in a washer engagement shoulder 26 which is disposed between the valve seal washer receiving surface 23 and the outlet surface 24. I have also provided this hollow sleeve 15 with a plurality of openings or outlets 27 which extend from the internal outlet surface 24 through the wall of the hollow sleeve 15 whereby water entering into the hollow sleeve 15 may exit from the sleeve 15 and into the faucet body 10, as illustrated in Figure 1.

The valve seal washer 16, as is best illustrated in Figure 3, of the drawings, is of washer shape and is preferably constructed from a resilient material, such, for example, as rubber. The valve seal washer 16 is provided with opposite surfaces 28 and 29 respectively, and an internal surface 30 defining the hole in the center of the washer. The washer has a diameter substantially equal to the diameter of the internal valve seal washer receiving surface 23 of the hollow sleeve 15. The washer 16 has a thickness (the axial length of the internal surface 30) slightly greater than the axial length of the valve seal washer receiving surface 23 of the hollow sleeve 15.

The flanged ferrule 17 is constructed to include a ferrule portion 31 and a flange portion 32. I have constructed these portions integral with each other, whereby the flanged ferrule is a unitary member. The flange portion 32 extends about the ferrule portion 31 between the ends thereof, thus dividing the ferrule portion 31. That part of the ferrule portion 31 on one side of the flange portion 32 extends into the opening in the valve seal washer 16 and engages the internal surface 30 thereof. This portion of the ferrule 31 which engages the valve seal washer 16 is designated by the reference character 33 and has a length less than the axial length of the internal surface 30 of the valve seal washer 16. That part of the ferrule portion 31 on the opposite side of the ferrule portion 32 is designated by the reference character 34 and is adapted to receive and support the packing seal member 18. This packing seal member 18 may be of any suitable construction and material which will enable it to form a leak-proof seat when it is forced against the old valve seat 37 in the faucet body 10.

Figure 2:
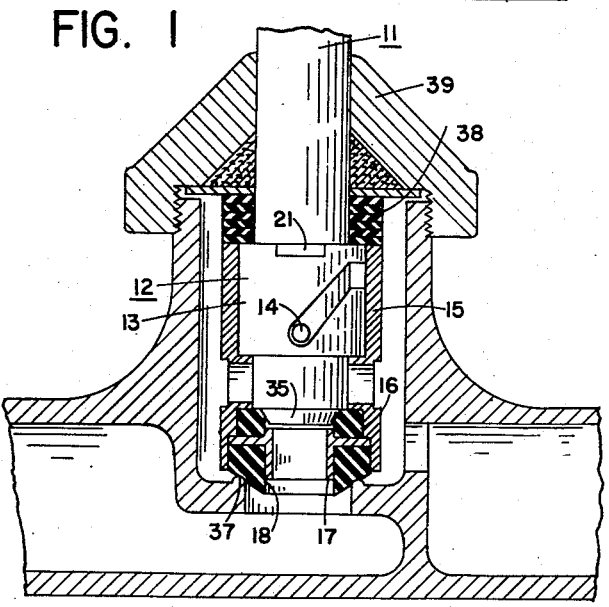
Figure 2 is a sectional view of my replacement valve structure with the valve in closed position.

As is best illustrated in Figures 1 and 2, the hollow sleeve 15 receives and supports the valve seal washer 16, the flanged ferrule 17 and the packing seal member 18. When these parts are assembled, the perimetrical portion of the surface 28 of the valve seal washer 16 abuts the washer engagement shoulder 26 and is held thereagainst by the flanged ferrule 17 which abuts the flanged ferrule engagement shoulder 25. The axial length of the valve seal washer receiving surface 23 of the hollow sleeve 15 thus is substantially the same as the axial length of the valve seal washer 16 after compression of said washer. The packing seal member 18 is fitted into the end of the hollow sleeve 15 and on the ferrule portion 34 until it engages the flange portion 32 of the flanged ferrule 17.

In this particular instance, the surfaces of the different parts in my valve structure are concentrically aligned or are aligned in planes parallel to each other. Thus, the ferrule is concentrically aligned with the internal surfaces of the hollow sleeve 15 and the valve stem 11. The surfaces 28 and 29 of the valve seal washer are in parallel alignment with the flange portion 32 and the shoulders 25 and 26 of the hollow sleeve 15.

In observing Figures 1 and 2, it is best noted that when the hollow sleeve 15 is on the cam sleeve 13, the valve stem 11 can move axially toward and away from the surface 28 of the seal washer 16. I have therefore provided the end of this valve stem 11 with a tapered plug 35 having a shoulder seat 36 thereabout. The tapered plug 35 has a length slightly less than the difference between the length of the internal surface 30 of the valve seal washer 16 and the ferrule portion 33 of the flanged ferrule 17. The outside diameter of the shoulder seat 36 is also slightly less than the diameter of the opening defined by the outlet surface 27 of the hollow sleeve 15.

When the valve stem is turned to its closed position, the tapered plug 35 extends into the opening in the valve seal washer 16 and is in alignment with the ferrule portion 31. The shoulder seat 36 engages that portion of the surface 28 of the valve seal washer 16 which is not abutted against the washer engagement shoulder 26. In this position, the shoulder seat 36 and the washer engagement shoulder 26 are thus very close to being in substantially the same plane or substantially co-extensive. The ferrule portion 33, the flange portion 32, the valve seal washer receiving surface 23, the washer engagement shoulder 26, the tapered plug 35 and the shoulder seat 36, thus cooperate to form a structure which substantially completely encloses the valve seal washer 16.

In Figure 1 of my drawings, I best illustrate the mounting of this replacement valve in a faucet or other similar device. The faucet body 10 has a valve seat 37 which after some time becomes rough and imperfect through use. When my new replacement valve is installed, a plurality of washers 38 are slipped into the valve stem 11 so that the faucet top 39 will force the hollow sleeve 15 toward the imperfect valve seat 37 when the faucet top 39 is threaded on to the faucet 10. The packing seal member 18 is forced against the imperfect valve seat 37 of the faucet and makes a seal tight connection therewith so that any water or other fluid entering the faucet must go through the coaxial openings in the packing seal member 18 and of the flanged ferrule 17 and the valve seal washer 16 before it can exit from the hollow sleeve 15 by means of the outlets 27. The new valve is thus formed with the valve seat being provided by the valve seal washer 16 and with the valve member being provided by the end of the valve stem 11, which in this instance is the tapered plug 35 and the shoulder seat 36.

In the closed position as indicated in Figure 2, the resilient valve seal washer is enclosed with part of its enclosure being accomplished by the tapered plug 35 and the shoulder seat 36. Any growth of this washer 16 due to deterioration will tend to reduce the diameter of the hole defined by surface 30, thus resulting in a more secure shutting off or closing of the valve.

Erosion sometimes takes place on a valve seat due to a partially closed valve or to the presence of foreign matter between the valve seat and the seal washer. This erosion roughens the surface of the metal valve part and will prevent a tight sealing off or closing of the valve. In this valve, if erosion takes place, it will occur on the extreme end of the tapered plug leaving the plug and the flange unimpaired. The valve stem and the other parts when constructed of metal may be easily chromium plated to provide a very hard surface, thereby decreasing the possibility of erosion.

With my construction, the resilient washers are confined in their surrounding structures so as to expose only the area necessary to provide a good seal. The packing seal member 18 is confined between the body of the faucet 10 and the flanged ferrule 17 so as to expose only the area necessary to seal off the old imperfect valve seat 37. Any growth of the packing seal member 18 due to deterioration will tend to increase the pressure between the valve and the old valve seat 37. The ferrule portion 31 prevents the packing seal member 18 from extruding and reducing the flow of liquids through the valve.

Sufficient friction is created between this packing seal member and the old imperfect valve seat on the faucet 10 to prevent the packing seal member 18 and the hollow sleeve 15 from turning relative to the faucet 10. The frictional engagement between the hollow sleeve 15 and the cam sleeve 13 along with the tab and notch provisions thereof prevent the cam sleeve 13 from turning relative to the faucet 10. Thus turning of the valve stem 11, by means of its ordinary handle, relative to the faucet 10 will move the tapered plug 35 endwise into and out of the valve seal washer 16 to open or close the valve.

Although my invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In a replacement valve for a faucet, a hollow sleeve having an internal surface terminating in an internal shoulder, a hollow flanged ferrule portion, said flange portion extending in parallel alignment with said internal shoulder and spaced therefrom, said ferrule portion being in concentric alignment with said internal surface and axially spaced therefrom, said ferrule portion having a length considerably less than the axial spacing between said flange portion and said internal shoulder, a resilient washer within said sleeve and between said flange portion and said internal shoulder, a valve member having an end portion aligned with said ferrule and extendable into said washer, said valve member also having a shoulder surface encircling said end portion and seatable against said washer and alignable in the plane of said internal shoulder, said valve member cooperating with said sleeve and said flanged ferrule to substantially enclose said washer when said valve member is in a closed position.

2. In a replacement valve for a faucet, a hollow sleeve having a first end and a second end with a row of openings annularly spaced about said sleeve and between the ends thereof, a first internal surface extending inwardly from the first end of said sleeve and terminating in a first shoulder, a second internal surface smaller in periphery than the first surface and extending inwardly from said first shoulder, said second internal surface terminating in a second shoulder, a ferrule having a flange seatable against said first shoulder, a seal washer extending about said ferrule and between said flange and said second shoulder, and a valve member having an end portion movable into said seal washer and having a surface about said end portion seatable against said seal washer, said second shoulder, second internal surface, and ferrule and said end portion and surface of said valve member substantially enclosing said seal washer when said valve member is in a closed position.

3. In a replacement valve for a faucet, a hollow sleeve having a first internal surface extending inwardly from one end of said sleeve and terminating in a first shoulder, a second internal surface smaller in periphery than the first surface and extending inwardly from said first shoulder, said second internal surface terminating in a second shoulder, a ferrule having a flange seatable against said first shoulder, a seal washer extending about said ferrule and between said flange and said second shoulder, and a valve member having an end portion movable into said seal washer and having a surface about said end portion seatable against said seal washer, said second shoulder, second internal surface, and ferrule and said end portion and surface of said valve member substantially enclosing said seal washer when said valve member is in a closed position.

4. A valve unit comprising, a sleeve open at least at a first axial end thereof, said sleeve having first and second internal cylindrical surfaces of differing diameters, with a shoulder therebetween, said first and second surfaces decreasing in diameter and being disposed in that order from said first end, a valve stem having an outer cylindrical surface designed to be received inside and axially movable in said sleeve and coaxial therewith, said stem having a first end with a frustro-conical portion and a shoulder portion surrounding said frustro-conical portion, a seal washer having first and second faces and inner and outer generally cylindrical surfaces, a flanged ferrule having a ferrule portion and a flange portion extending outwardly therefrom, the inner surface of said seal washer being receivable on said ferrule portion, said washer and flanged ferrule being receivable in said first end of said sleeve with the outer periphery of said first face of said seal washer abutting said shoulder, and said ferrule portion, said flange portion, said first cylindrical surface of said sleeve, and said shoulder in combination with the frustro-conical and shoulder portions of said valve stem closely engaging and substantially enclosing said seal washer when said valve stem is in a closed position.

5. A valve unit comprising, a sleeve open at least at a first axial end thereof, said sleeve having first and second internal cylindrical surfaces of differing diameters with a shoulder therebetween, said first and second surfaces decreasing in diameter and being disposed in that order from said first end, a valve stem having an outer cylindrical surface designed to be received inside and axially movable in said sleeve and coaxial therewith, said valve stem having a first end with a frustro-conical portion and a shoulder portion surrounding said frustro-conical portion, a seal washer having first and second substantially parallel faces and inner and outer generally cylindrical surfaces, a flanged ferrule having first and second ferrule portions and a flange portion therebetween extending outwardly substantially normal to said axis, and a packing washer having inner and outer generally cylindrical surfaces and having a first face, said first face being substantially perpendicular to the inner and outer surfaces of said packing washer, the inner surfaces of said seal and packing washers being receivable on said first and second ferrule portions, respectively, with said flange portion therebetween as a washer assembly, said washer assembly being receivable in said first end of said sleeve with the outer periphery of said first face of said seal washer abutting said shoulder, and said first ferrule portion, said flange portion, said first cylindrical surface of said sleeve, and said shoulder in combination with the frustro-conical and shoulder portions of said valve stem closely engaging and substantially enclosing said seal washer when said valve stem is in a closed position.

6. A replacement valve unit for the valve stem of a faucet having a seat, comprising, a sleeve having an open first end, said sleeve having first, second and third internal cylindrical surfaces of differing diameters, first and second shoulders separating said three surfaces, said first, second and third surfaces decreasing in diameter and being disposed in that order from said first end, a valve rod having an outer cylindrical surface designed to be received inside and axially movable in said sleeve and coaxial therewith, said valve rod having a first end with a frustro-conical portion and a shoulder portion surrounding said frustro-conical portion, a seal washer having first and second substantially parallel faces and inner and outer generally cylindrical surfaces, a flanged ferrule having first and second ferrule portions and a flange portion therebetween extending outwardly substantially normal to said axis, and a packing washer having inner and outer generally cylindrical surfaces and having first and second faces, said first face being substantially perpendicular to the inner and outer surfaces of said packing washer, the inner surfaces of said seal and packing washers being receivable on said first and second ferrule portions, respectively, with said flange portion therebetween as a washer assembly, said washer assembly being receivable in said first end of said sleeve with the outer periphery of said first face of said seal washer abutting said second shoulder and with the outer periphery of said flange portion abutting said first shoulder, said sleeve, said valve rod and said washer assembly comprising said replacement valve unit, said second face of said packing washer being engageable with said faucet seat to establish therewith a fluid seal, and said first ferrule portion, said flange portion, said second cylindrical surface of said sleeve, and said second shoulder in combination with the frustro-conical and shoulder portions of said valve rod closely engaging and substantially enclosing said seal washer when said valve rod is in a closed position.

7. A replacement valve unit for the valve stem of a faucet having a seat, comprising, a hollow valve sleeve having first and second open ends, said sleeve having first, second and third internal cylindrical surfaces of differing diameters, first and second shoulders separating said three surfaces, said first, second and third surfaces decreasing in diameter and being disposed in that order from said first end, a plurality of radially disposed fluid openings in said sleeve at said third internal surface, a surface carried by said sleeve defining a cam groove having both axial and circumferential components, a valve rod having an outer cylindrical surface designed to be received inside the third cylindrical surface of said sleeve and coaxial therewith, a cam pin carried by said valve rod complementary to said cam groove to impart axial movement to said valve rod upon rotation thereof, first and second ends on said valve rod with said first end adapted to receive a handle for rotation of said valve rod, said second end of said valve rod having a frustro-conical portion and a shoulder portion surrounding said frustro-conical portion, a seal washer having first and second substantially parallel faces and inner and outer generally cylindrical surfaces, a flanged ferrule having first and second ferrule portions and a flange portion therebetween extending outwardly substantially normal to said axis, and a packing washer having inner and outer generally cylindrical surfaces and having first and second faces, said first face being substantially perpendicular to the inner and outer surfaces of said packing washer and said second face defining a protruding nose having a generally conical shape, the inner surfaces of said seal and packing washers being receivable on said first and second ferrule portions, respectively, with said flange portion therebetween as a washer assembly, said washer assembly being receivable in said first end of said valve sleeve with the outer periphery of said first face of said seal washer abutting said second shoulder and with the outer periphery of said flange portion abutting said first shoulder, said valve sleeve, said valve rod and said washer assembly comprising said replacement valve unit, said second face of said packing washer being engageable with said faucet seat to establish therewith a fluid seal, and said first ferrule portion, said flange portion, said second cylindrical surface of said valve sleeve, and said second shoulder in combination with the frustro-conical and shoulder portions of said valve rod closely engaging and substantially enclosing said seal washer when said valve rod is in a closed position.

8. A replacement valve unit for the valve stem of a faucet having a seat, comprising, a hollow valve sleeve having first and second open ends, said sleeve having first, second, third and fourth internal cylindrical coaxial surfaces of different diameters, first, second and third shoulders separating said four surfaces, said first, second and third surfaces decreasing in diameter and being disposed in that order from said first end, said fourth surface having a diameter larger than said third surface, a plurality of radially disposed fluid openings in said sleeve at said third internal surface, a cam sleeve coaxial with and receivable in said fourth internal surface, means for rotatively locking said cam sleeve to said valve sleeve, said cam sleeve having an end abutting said third shoulder and having a length substantially the length of said fourth internal surface, a surface in said cam sleeve defining a cam groove having both axial and circumferential components, a valve rod having an outer cylindrical surface designed to be received inside said cam sleeve and coaxial therewith, a cam pin carried by said valve rod complementary to said cam groove to impart axial movement to said valve rod upon rotation thereof, first and second ends on said valve rod with said first end adapted to extend outside said valve sleeve to receive a handle for rotation of said valve rod, said second end of said valve rod having a frustro-conical portion and a shoulder portion surrounding said frustro-conical portion, a seal washer having first and second substantially parallel faces and inner and outer generally cylindrical surfaces, a flanged ferrule having first and second ferrule portions and a flange portion therebetween extending outwardly substantially normal to said axis, and a packing washer having inner and outer generally cylindrical surfaces and having first and second faces, said first face being substantially perpendicular to the inner and outer surfaces of said packing washer and said second face defining a protruding nose having a generally conical shape, the inner surfaces of said seal and packing washers being receivable on said first and second ferrule portions, respectively, with said flange portion therebetween as a washer assembly, said washer assembly being receivable in said first end of said valve sleeve with the outer periphery of said first face of said seal washer abutting said second shoulder and with the outer periphery of said flange portion abutting said first shoulder, said valve and cam sleeves, said valve rod and said washer assembly comprising said replacement valve unit, said second face of said packing washer being engageable with said faucet seat to establish therewith a fluid seal, said first cylindrical surface of said valve sleeve, said flange portion and said second ferrule portion in combination with said faucet seat closely engaging and substantially enclosing said packing washer, and said ferrule portion, said flange portion, said second cylindrical surface of said valve sleeve, and said second shoulder in combination with the frustro-conical and shoulder portions of said valve rod closely engaging and substantially enclosing said seal washer when said valve rod is in a closed position.

9. A valve, comprising, a hollow sleeve having an internal surface terminating in an internal shoulder, a hollow member having a flange portion extending in parallel alignment with said internal shoulder and spaced therefrom, a resilient washer within said sleeve and between said flange portion and said internal shoulder, an internal surface on said washer, a valve member having an end portion aligned with and extendable into the internal surface of said washer, said valve member also having a shoulder surface encircling said end portion and seatable against said washer and alignable in the plane of said internal shoulder, said valve member cooperating with said sleeve and said hollow member to substantially enclose said washer when said valve member is in a closed position.

10. A valve, comprising, a hollow sleeve having an internal surface terminating in an internal shoulder, a hollow member having a flange portion extending in parallel alignment with said internal shoulder and spaced therefrom, a resilient washer within said sleeve and between said flange portion and said internal shoulder, an internal surface on said washer, a valve member having an end portion aligned with and extendable into the internal surface of said washer, said valve member also having a shoulder surface encircling said end portion and seatable against said washer and alignable in the plane of said internal shoulder, the combination of said valve member end portion and said hollow member engaging substantially the entire internal surface of said resilient washer and said valve member cooperating with said sleeve and said hollow member to substantially enclose said washer when said valve member is in a closed position.

11. A replacement valve for a faucet having a body and a faucet seat, said replacement valve comprising, an open ended sleeve, a seal washer and a packing washer, said packing washer having inner and outer peripheral surfaces and first and second faces, said first face of said packing washer adapted to frictionally and sealingly engage said faucet seat to seal off the flow of fluid therebetween, rigid support means inside said sleeve and co-operating with said sleeve to contain the outer and inner surfaces and said second face of said packing washer to prevent extrusion thereof, a valve rod having an end and axially movable inside said sleeve and cooperating therewith, said sleeve, said rigid support means and said valve rod end when in closed position comprising a rigid support to substantially enclose said seal washer to prevent extrusion thereof.

12. A replacement valve for a faucet having a body and a faucet seat, said replacement valve comprising, an open ended sleeve, a seal washer and a packing washer, said packing washer having inner and outer peripheral surfaces and first and second faces, said first face of said packing washer adapted to frictionally and sealingly engage said faucet seat to seal off the flow of fluid therebetween, rigid support means inside said sleeve and cooperating with said sleeve to contain the outer and inner surfaces and said second face of said packing washer, a valve rod having an end and axially movable inside said sleeve and cooperating therewith, a frusto-conical portion on said valve rod end, a shoulder on said valve rod end surrounding said frustro-conical portion, said sleeve, said rigid support means and said valve rod end when in closed position comprising a rigid support to substantially enclose said seal washer.

13. A replacement valve for a faucet having a body and a faucet seat, said replacement valve comprising, an open ended sleeve having radial openings therein, a seal washer and a packing washer, said packing washer having inner and outer peripheral surfaces and first and second faces, said first face of said packing washer adapted to frictionally and sealingly engage said faucet seat to seal off the flow of fluid therebetween, rigid support means inside said sleeve and cooperating with said sleeve to contain the outer and inner surfaces and said second face of said packing washer to prevent extrusion thereof, a valve rod having an end and axially movable inside said sleeve and cooperating therewith, said sleeve, said rigid support means and said valve rod end when in closed position comprising a rigid support to substantially enclose said seal washer to prevent extrusion thereof, and said radial openings in said sleeve providing fluid communication through a portion of said sleeve and through said faucet when said valve rod is in an open position.

14. A replacement valve to replace a faucet stem in a faucet having a body and a faucet seat, said replacement valve comprising an open ended sleeve having radial openings therein, a seal washer and a packing washer, said packing washer having inner and outer peripheral surfaces and first and second faces, rigid support means inside said sleeve and cooperating with said sleeve to contain the outer and inner surfaces and said second face of said packing washer, said first face of said packing washer arranged to frictionally and sealingly engage said faucet seat to seal off the flow of fluid therebetween, a valve rod having an end and axially movable inside said sleeve and cooperating therewith, a frustro-conical portion on said valve rod end, a shoulder on said valve rod end surrounding said frustro-conical portion, said sleeve, said rigid support means and said valve rod end when in closed position comprising a rigid support to substantially enclose said seal washer, said radial openings in said sleeve providing fluid communication through a portion of said sleeve and through said faucet when said valve rod is in an open position.

References Cited in the file of this patent

UNITED STATES PATENTS

| | | |
|---|---|---|
| 453,265 | Mayo | June 2, 1891 |
| 852,155 | Bashlin | Apr. 30, 1907 |
| 925,679 | Bonfield | June 22, 1909 |
| 1,439,444 | Prendergast | Dec. 19, 1922 |
| 1,667,580 | Albrecht | Apr. 24, 1928 |
| 1,988,966 | Eckhouse | Jan. 22, 1935 |
| 2,186,499 | Riva | Jan. 9, 1940 |
| 2,254,253 | Williams | Sept. 2, 1941 |
| 2,549,010 | Rhodes | Apr. 17, 1951 |

FOREIGN PATENTS

| | | |
|---|---|---|
| 517,474 | Germany | 1931 |
| 586,854 | France | 1925 |